(12) United States Patent
Kobayashi

(10) Patent No.: US 6,426,385 B2
(45) Date of Patent: Jul. 30, 2002

(54) RESIN COMPOSITION AND INJECTION-MOLDED ARTICLE

(75) Inventor: Shigeichi Kobayashi, Sodegaura (JP)

(73) Assignee: Sumitomo Chemical Company Limited, Osaka (JP)

(*) Notice: Subject to any disclaimer, the term of this patent is extended or adjusted under 35 U.S.C. 154(b) by 0 days.

(21) Appl. No.: 09/780,486

(22) Filed: Feb. 12, 2001

(30) Foreign Application Priority Data

Mar. 2, 2000 (JP) .......................... 2000-057151

(51) Int. Cl.⁷ .................. C08L 23/08; B29K 45/00; B29K 23/00
(52) U.S. Cl. ...................... 525/191; 525/240
(58) Field of Search ................. 525/191, 240

(56) References Cited

FOREIGN PATENT DOCUMENTS

| JP | 06-313072 | 11/1994 |
|---|---|---|
| JP | 07-316352 | 12/1995 |
| JP | 8-302084 | 11/1996 |
| JP | 10-36583 | 2/1998 |
| JP | 11-228755 | 8/1999 |
| JP | 2000-6338 | 1/2000 |

*Primary Examiner*—Nathan Nutter
(74) *Attorney, Agent, or Firm*—Sughrue Mion, PLLC

(57) ABSTRACT

A resin composition containing:

(A) an ethylene-α-olefin copolymer having a melt flow rate of from 0.5 to 100 g/10 min, a density of from 860 to 920 kg/m³, and a highest melting peak temperature of from 50° C. to 110° C.;

(B) an ethylene homopolymer or ethylene-α-olefin copolymer having a melt flow rate of from 0.5 to 100 g/10 min, a density of from 910 to 980 kg/m³, and a highest melting peak temperature of from 110° C. to 135° C.; and (C) a low-density polyethylene having a melt flow rate of from 0.5 to 100 g/10 min, and a swell ratio of from 1.3 to 2.0, provides a molded article superior in mold release properties, flexibility and heat resistance, particularly when used in injection molding.

16 Claims, No Drawings

RESIN COMPOSITION AND INJECTION-MOLDED ARTICLE

FIELD OF THE INVENTION

The present invention relates to a resin composition and an injection-molded article. Particularly, the present invention relates to a resin composition that can provide a molded article superior in mold release properties, flexibility and heat resistance, especially when used in injection molding, and to the injection-molded article. The improved release properties of the resin composition according to the present invention are very desirable for the finish and productivity of the molded article. The resin composition according to the present invention is most suitably used for making, in particular, injection-molded articles to which are required flexibility and heat resistance, such as containers, caps, packings and gaskets.

BACKGROUND OF THE INVENTION

As resin compositions for obtaining articles that are required to have flexibility and heat resistance, such as containers, caps, packings and gaskets, by an injection molding method, there are known resin compositions disclosed in JP-A-6-313072 and JP-A-7-316352.

The former reference discloses a resin composition comprising a copolymer of ethylene and an α-olefin of 4 or more carbon atoms which has specific properties and an olefin polymer such as a high-pressure-produced low-density polyethylene or a linear low-density polyethylene. The latter reference discloses a resin composition comprising an ethylene-α-olefin copolymer having a relatively low density and a relatively low highest melting peak temperature measured with a differential scanning calorimeter (hereinafter referred to also as DSC) and an ethylene-α-olefin copolymer having a relatively high density and a relatively high highest melting peak temperature measured with DSC.

The resin compositions disclosed in the above references, however, involve problems such as unsatisfactory mold release properties as an injection-molded article and insufficient flexibility and heat resistance as the resulting molded article.

SUMMARY OF THE INVENTION

An object of the present invention is to provide a resin composition that can provide a molded article superior in mold release properties, flexibility and heat resistance, particularly when used in injection molding, and the injection-molded article.

The present inventor has earnestly done investigation in order to achieve the above object. As a result, the present inventor found that a resin composition comprising an ethylene-α-olefin copolymer having specific properties, an ethylene homopolymer or ethylene-α-olefin copolymer having specific properties, and a low-density polyethylene obtained by a high-pressure radical polymerization method and having specific properties can achieve the above object, whereby the present invention has been accomplished.

That is, the present invention relates to a resin composition comprising:

(A) an ethylene-α-olefin copolymer meeting the following conditions (A-1), (A-2) and (A-3):

(A-1) the melt flow rate (MFR) is in the range of from 0.5 to 100 g/10 min, (A-2) the density is in the range of from 860 to 920 kg/m$^3$, and (A-3) the highest melting peak temperature determined with a differential scanning calorimeter is in the range of from 50° C. to 110° C.;

(B) an ethylene homopolymer or ethylene-α-olefin copolymer meeting the following conditions (B-1), (B-2) and (B-3):

(B-1) the melt flow rate (MFR) is in the range of from 0.5 to 100 g/10 min, (B-2) the density is in the range of from 910 to 980 kg/m$^3$, and (B-3) the highest melting peak temperature determined with a differential scanning calorimeter is in the range of from 110° C. to 135° C.; and (C) a low-density polyethylene as high-pressure radical polymerization product which meets the following conditions (C-1) and (C-2):

(C-1) the melt flow rate (MFR) is in the range of from 0.5 to 100 g/10 min, and (C-2) the swell ratio (SR) is in the range of from 1.3 to 2.0, said resin composition comprising 40 to 90% by weight of component (A), 5 to 30% by weight of component (B) and 5 to 30% by weight of component (C) when the total proportion of component (A), component (B) and component (C) is taken as 100% by weight.

In addition, the present invention relates to an injection-molded article comprising the above-mentioned composition.

DETAILED DESCRIPTION OF THE INVENTION

The ethylene-α-olefin copolymer (A) used in the present invention refers to a copolymer of ethylene and one or more α-olefins of 3 to 12 carbon atoms. The α-olefins include, for example, propylene, butene-1, pentene-1, 4-methyl-1-pentene, hexene-1, octene-1 and decene-1. Of these, propylene, butene-1, hexene-1 and octene-1 are preferable, and butene-1 and hexene-1 are more preferable.

The content of the structural units derived from ethylene (hereinafter referred to as "ethylene units") in component (A) is preferably in the range of from 65 to 95% by weight, more preferably from 68 to 90% by weight. The content of the structural units derived from the α-olefin(s) (hereinafter referred to as "α-olefin units") in component (A) is preferably in the range of from 5 to 35% by weight, more preferably from 10 to 32% by weight.

Component (A) includes, for example, ethylene-propylene copolymers, ethylene-butene-1 copolymers, ethylene-4-methyl-1-pentene copolymers, ethylene-hexene-1 copolymers, ethylene-octene-1 copolymers and ethylene-propylene-butene-1 terpolymers. Of these, ethylene-propylene copolymers, ethylene-butene-1 copolymers, ethylene-hexene-1 copolymers and ethylene-octene-1 copolymers are preferable, and ethylene-butene-1 copolymers and ethylene-hexene-1 copolymers are more preferable.

The melt flow rate (hereinafter referred to also as MFR) of component (A) is in the range of from 0.5 to 100 g/10 min, preferably from 1 to 50 g/10 min, more preferably from 2 to 25 g/10 min. When MFR is less than 0.5 g/10 min, the resulting resin composition has an insufficient flowability and hence it has a low injection moldability in some cases. On the other hand, when MFR is more than 100 g/10 min, an injection-molded article having an insufficient strength is obtained in some cases.

The density of component (A) is in the range of from 860 to 920 kg/m$^3$, preferably from 863 to 910 kg/m$^3$, more preferably from 865 to 905 kg/m$^3$. When the density is less than 860 kg/m$^3$, the resulting injection-molded article has an insufficient heat resistance in some cases. On the other hand, when the density is more than 920 kg/m$^3$, the resulting injection-molded article has too high a stiffness and hence an insufficient flexibility in some cases.

The highest melting peak temperature of component (A) determined with a differential scanning calorimeter is in the range of from 50° C. to 110° C., preferably from 55° C. to 100° C., more preferably from 60° C. to 90° C. When said peak temperature is lower than 50° C., the resulting injection-molded article has an insufficient heat resistance in some cases. On the other hand, when said peak temperature is higher than 110° C., the resulting injection-molded article has too high a stiffness and hence an insufficient flexibility in some cases.

A process for producing component (A) is not limited, and a well-known copolymer may be used as component (A). A preferable production process of component (A) is a process comprising copolymerizing ethylene with one or more α-olefins in the presence of a metallocene-based catalyst. The metallocene-based catalyst includes, for example, catalysts comprising a metallocene complex and an aluminoxane, and catalysts comprising a metallocene complex and an organoaluminum compound and/or a boron compound. Specific examples of the metallocene-based catalysts are a catalyst comprising dimethylsilylene (tetramethylcyclopentadienyl)(3-tert-butyl-2-phenoxy) titanium dichloride, triisobutyl-aluminum and N,N-dimethylanilinium (pentafluorophenyl)-borate (see JP-A-9-87313) and a catalyst comprising dimethylsilylene (tetramethylcyclopentadienyl)(3-tert-butyl-2-phenoxy) titanium dimethoxide, triisobutyl-aluminum and N,N-dimethylanilinium (pentafluorophenyl)-borate (see JP-A-10-259211).

As to the ethylene homopolymer or ethylene-α-olefin copolymer (B) used in the present invention, the ethylene homopolymer refers to a polymer consisting of ethylene units alone, and the ethylene-α-olefin copolymer refers to a copolymer of ethylene and one or more α-olefins of 3 to 12 carbon atoms. The α-olefins include, for example, propylene, butene-1, pentene-1, 4-methyl-1-pentene, hexene-1, octene-1 and decene-1. Of these, propylene, butene-1, hexene-1 and octene-1 are preferable, and butene-1 and hexene-1 are more preferable.

In the ethylene-α-olefin copolymer as component (B), the content of ethylene units is preferably in the range of from 90 to 100% by weight, more preferably from 93 to 99% by weight, and the contents of α-olefin units is preferably in the range of from 0 to 10% by weight, more preferably from 1 to 7% by weight.

The ethylene-α-olefin copolymer as component (B) includes, for example, ethylene-propylene copolymers, ethylene-butene-1 copolymers, ethylene-4-methyl-1-pentene copolymers, ethylene-hexene-1 copolymers, ethylene-octene-1 copolymers and ethylene-propylene-butene-1 terpolymers. Of these, ethylene-propylene copolymers, ethylene-butene-1 copolymers, ethylene-hexene-1 copolymers and ethylene-octene-1 copolymers are preferable, and ethylene-butene-1 copolymers and ethylene-hexene-1 copolymers are more preferable. Ethylene homopolymers are also more preferable as component (B).

The melt flow rate (MFR) of component (B) is in the range of from 0.5 to 100 g/10 min, preferably from 1 to 70 g/10 min, more preferably from 5 to 60 g/10 min. When the MFR is less than 0.5 g/10 min, the resulting resin composition has an insufficient flowability and hence it has a low injection moldability in some cases. On the other hand, when the MFR is more than 100 g/10 min, an injection-molded article having an insufficient strength is obtained in some cases.

The density of component (B) is in the range of from 910 to 980 kg/m$^3$, preferably from 915 to 965 kg/m$^3$, more preferably from 920 to 950 kg/m$^3$. When the density is less than 910 kg/m$^3$, the resulting injection-molded article has an insufficient heat resistance in some cases. On the other hand, when the density is more than 980 kg/m$^3$, the resulting injection-molded article has too high a stiffness and hence an insufficient flexibility in some cases.

The highest melting peak temperature of component (B) determined with a differential scanning calorimeter is in the range of from 110° C. to 135° C., preferably from 115° C. to 135° C., more preferably from 120° C. to 132° C. When said peak temperature is lower than 110° C., the resulting injection-molded article has an insufficient heat resistance in some cases. On the other hand, when said peak temperature is higher than 135° C., the resulting injection-molded article has too high a stiffness and hence an insufficient flexibility in some cases.

A process for producing component (B) is not limited, and a well-known homopolymer or copolymer may be used as component (B). A preferable production process of component (B) is a process comprising polymerizing ethylene alone or copolymerizing ethylene with one or more α-olefins, by the use of a Ziegler-Natta catalyst in the presence or absence of a solvent usually at 30° C. to 300° C. and at atmospheric pressure to 300 MPa. The Ziegler-Natta catalyst is not limited. Preferable examples of the Ziegler-Natta catalyst are catalysts comprising a solid catalyst component containing a titanium atom, a halogen atom and an Mg atom and an organoaluminum compound. More preferable examples of the Ziegler-Natta catalyst are catalysts comprising a solid catalyst component containing a titanium atom, a halogen atom and an Mg atom, an organoaluminum compound and a silicon compound. Specific examples of the Ziegler-Natta catalyst are catalysts comprising (TiCl$_3$.($\frac{1}{3}$)AlCl$_3$) (MgCl$_2$)$_n$, a trialkylaluminum and a silicon compound (see JP-A-1-69609).

The low-density polyethylene as high-pressure radical polymerization product (C) used in the present invention is a low-density polyethylene obtained by a high-pressure radical polymerization method. Here, the high-pressure radical polymerization method is a well-known polymerization method, is not particularly limited and means a method in which a polymer is produced by allowing polymerization to initiate and proceed under a high pressure by the use of a radical-generating agent. As a generally practiced high-pressure radical polymerization method, a method can be In exemplified in which a polymer is produced by allowing polymerization to initiate and proceed by the use of a radical-generating agent (e.g., a peroxide and oxygen) in a vessel reactor or a tubular reactor under conditions of a polymerization pressure of 100 to 300 MPa and a polymerization temperature of 130° C. to 300° C. The melt flow rate of the resulting polymer can be controlled by using a hydrocarbon (e.g., methane and ethane) or hydrogen as a molecular weight regulator. The swell ratio (hereinafter referred to also as SR) and density of the polymer can be controlled by properly choosing the polymerization temperature and pressure within the above ranges.

The melt flow rate (MFR) of component (C) is in the range of from 0.5 to 100 g/10 min, preferably from 1 to 50 g/10 min, more preferably from 2 to 25 g/10 min. When the MFR is less than 0.5 g/10 min, the resulting resin composition has an insufficient flowability and hence it has a low injection moldability in some cases. On the other hand, when the MFR is more than 100 g/10 min, an injection-molded article having unsatisfactory mold release properties is obtained in some cases.

The swell ratio (SR) of component (C) is in the range of from 1.3 to 2.0, preferably from 1.55 to 1.95, more preferably from 1.60 to 1.90. When the SR is less than 1.3, an injection-molded article having unsatisfactory mold release properties is obtained in some cases. On the other hand, when the SR is more than 2.0, an injection-molded article having an insufficient surface gloss is obtained in some cases.

The density of component (C) may be any density so long as it is low. It is preferably in the range of from 910 to 930 kg/m$^3$, more preferably from 915 to 925 kg/m$^3$.

The proportions of components (A) through (C) are as follows: the proportion of component (A) is in the range of from 40 to 90% by weight, preferably from 55 to 84% by weight, more preferably from 59 to 84% by weight; the proportion of component (B) is in the range of from 5 to 30% by weight, preferably from 8 to 25% by weight, more preferably from 8 to 23% by weight; and the proportion of component (C) is in the range of from 5 to 30% by weight, preferably from 8 to 20% by weight, more preferably from 8 to 18% by weight. Here, the total proportion of component (A), component (B) and component (C) is taken as 100% by weight.

When the proportion of component (A) is less than 40% by weight, the resulting injection-molded article has too high a stiffness and hence an insufficient flexibility in some cases. On the other hand, when the proportion is more than 90% by weight, the resulting injection-molded article has an insufficient heat resistance in some cases.

When the proportion of component (B) is less than 5% by weight, the resulting injection-molded article has an insufficient heat resistance in some cases. When the proportion is more than 30% by weight, the resulting injection-molded article has too high a stiffness and hence an insufficient flexibility in some cases.

When the proportion of component (C) is less than 5% by weight, the resulting injection-molded article has unsatisfactory mold release properties in some cases. On the other hand, when the proportion is more than 30% by weight, the resulting injection-molded article has too high a stiffness and hence it has an insufficient flexibility in some cases.

The mold shrinkage factor of the injection-molded article of the present invention is not limited and is preferably in the range of from 1.2 to 1.6%, more preferably from 1.2 to 1.4%. When the mold shrinkage factor is less than 1.2%, the resulting injection-molded article has unsatisfactory mold release properties in some cases. On the other hand, when the mold shrinkage factor is more than 1.6%, the resulting injection-molded article is distorted or has no stable dimensions in some cases.

A process for producing the resin composition of the present invention is not limited and may be a well-known process. As said production process, a process can be exemplified in which component (A) through (C) are uniformly mixed by a method such as a tumbler blender method, Henschel mixer method, Banbury mixer method or piston granulation method.

If necessary, components (A) through (C) used in the present invention may be used in combination with conventional additives such as stabilizers (e.g., antioxidants), neutralizing agents, dispersing agents, lubricants, weather resistance improvers, antistatic agents, pigments and fillers so long as the additives do not affect the object of the present invention.

The antioxidants include, for example, phenolic stabilizers such as n-octadecyl-3-(4'-hydroxy-3,5'-di-t-butylphenyl) propionate (IRGANOX 1076, a trade name) and phosphite stabilizers such as bis(2,4-di-t-butylphenyl)-pentaerythritol diphosphite and tris(2,4-di-t-butylphenyl) phosphite. The neutralizing agents include, for example, hydrotalcite and calcium stearate. The lubricants include, for example, higher fatty acid amides and higher fatty acid esters. The antistatic agents include, for example, glycerol esters of fatty acids of 8 to 22 carbon atoms, sorbitan acid esters and polyethylene glycol esters.

If necessary, components (A) through (C) used in the present invention may be used in combination with at least one of various resins so long as the resins do not affect the object of the present invention. As resins for controlling physical properties such as stiffness of the resulting resin composition, there can be exemplified resins such as polypropylenes, ethylene-vinyl acetate copolymers, ethylene-methyl methacrylate copolymers, ethylene-ethyl acrylate copolymers, etc.

EXAMPLES

The present invention is illustrated with reference to the following examples, which should not be construed as limiting the scope of the invention.

Evaluation methods are as follows.

1. Melt flow rate (MFR)

Determined at a temperature of 190° C. under a load of 2.16 kg according to JIS-K 7210.

2. Density

Determined according to JIS-K 6760 by using a sheet of 1 mm thickness obtained by press molding a test sample at 150° C. The density of component (A) was measured without annealing, and the density of component (B) was measured after annealing.

3. Swell ratio (SR)

In measuring the melt flow rate according to JIS K 7210 (temperature=190° C., load=2.16 kg, inside diameter of orifice=2.1 mm), a resin strand obtained by extrusion through an orifice was cooled and then the ratio of the outside diameter of the strand to the inside diameter of the orifice (the outside diameter of the strand/the inside diameter of the orifice) was taken as swell ratio.

4. Highest melting peak temperature determined with a differential scanning calorimeter (DSC)

After a test piece was conditioned according to the item 3-(2) of JIS-K 7121, the highest melting peak temperature of the test piece was measured according to JIS-K 7121 by using DSC Model 7 manufactured by Perkin-Elmer Corporation. Here, the highest melting peak temperature is defined as the highest temperature among the temperatures at which the peaks are observed.

5. Stiffness in torsion

Determined according to JIS-K 6730 by using a sheet of 3 mm thickness obtained by press molding a test sample at 150° C. The lower the stiffness in torsion, the higher the flexibility.

6. Mold release properties

The mold release properties of a 15-cm square and 1.5-mm thick molded article obtained by injection molding under conditions of an injection pressure of 80 MPa, a cylinder temperature of 200° C., a mold temperature of 40° C. and a molding cycle of 40 seconds by the use of an injection molding machine having a trade name of IS-100EN and manufactured by Toshiba Machine Co., Ltd. were visually evaluated. Satisfactory release is expressed by ○, and unsatisfactory release by X.

7. Mold shrinkage factor

A percentage calculated by the equation described below from the size (150 mm) of the mold used for evaluating the mold release properties and the size (mm) of the molded article was taken as mold shrinkage factor. In this case, the average of the length and width of the molded article, each of the length and the width being measured at substantially the central part of the molded article, was taken as the size of the molded article. The higher the mold shrinkage factor, the better the mold release properties.

Mold shrinkage factor (%) =(Size of mold−Size of molded article)×100/Size of mold 8. Heat resistance A sheet of 1 mm thickness obtained by press molding a test sample at 150° C. was heated in an oven at 110° C. for 1 hour. Slight distortion by the heating is expressed by ○ (satisfactory heat resistance), and serious distortion by the heating by X (unsatisfactory heat resistance).

Component (A) through (C) used are as follows.

A1

An ethylene-hexene-1 copolymer (content of hexene-1 units=29% by weight) having a melt flow rate of 16 g/10 min, a density of 873 kg/m$^3$ and a highest melting peak temperature determined with a differential scanning calorimeter of 68° C.

A2

An ethylene-hexene-1 copolymer (content of hexene-1 units=26% by weight) having a melt flow rate of 12 g/10 min, a density of 880 kg/m$^3$ and a highest melting peak temperature determined with a differential scanning calorimeter of 72° C.

B1

An ethylene-butene-1 copolymer (content of butene-1 units=4% by weight) (Sumikathene-L GA804, a trade name, mfd. by Sumitomo Chemical Co., Ltd.) having a melt flow rate of 50 g/10 min, a density of 930 kg/m$^3$ and a highest melting peak temperature determined with a differential scanning calorimeter of 125° C.

C1

A low-density polyethylene as high-pressure radical polymerization product (Sumikathene G701, a trade name, mfd. by Sumitomo Chemical Co., Ltd.) having a melt flow rate of 7 g/10 min and a swell ratio of 1.75.

C2

A low-density polyethylene as high-pressure radical polymerization product (Sumikathene G201, a trade name, mfd. by Sumitomo Chemical Co., Ltd.) having a melt flow rate of 2 g/10 min and a swell ratio of 1.75.

Examples 1 to 3 and Comparative Examples 1 to 6

The components shown in Table 1 were melt-kneaded in the proportions shown in Table 1, at 180° C. in an extruder having a screw with a diameter of 30 mm, to obtain resin compositions. Table 1 shows the results of evaluating molded articles obtained by injection-molding each of the resin compositions. In this case, components (A1) and (A2) were produced as follows. Production of component (A1)

Each of ethylene and hexene-1 was continuously fed to an autoclave continuous reactor so that the proportion of hexene-1 might be 35% by mole (the total proportion of ethylene and hexene-1 was taken as 100% by mole), and they were copolymerized in the presence of a metallocene-based catalyst under a pressure of 78 MPa at a temperature of 215° C. to obtain component (A1). As the metallocene-based catalyst, there was used a catalyst obtained from 1 part by mole of dimethylsilylene(tetramethylcyclopentadienyl)(3-tert-butyl-2-phenoxy)titanium dimethoxide, 50 parts by mole of trilsobutylaluminum and 6 parts by mole of N,N-dimethylanilinium (pentafluorophenyl)borate. Production of component (A2)

Component (A2) was obtained in the same manner as in the above production of component (A1), except that the amount of N,N-dimethylanilinium (pentafluorophenyl) borate was changed to 2 parts by mole, the proportion of hexene-1 to 33% by mole, the pressure to 81 MPa, and the temperature to 199° C.

TABLE 1

|  | Example | | | Comparative Example | | | | | |
|---|---|---|---|---|---|---|---|---|---|
|  | 1 | 2 | 3 | 1 | 2 | 3 | 4 | 5 | 6 |
| Composition | | | | | | | | | |
| Component (A) | A2 | A1 | A2 | A2 | A2 | A2 | A2 | A2 | A2 |
| Proportion (wt %) | 75 | 70 | 75 | 80 | 80 | 78 | 78 | 50 | 50 |
| Component (B) | B1 | B1 | B1 | B1 | — | B1 | B1 | B1 | B1 |
| Proportion (wt %) | 10 | 20 | 10 | 20 | — | 2 | 20 | 40 | 10 |
| Component (C) | C1 | C2 | C2 | — | C2 | C2 | C2 | C2 | C2 |
| Proportion (wt %) | 15 | 10 | 15 | — | 20 | 20 | 2 | 10 | 40 |
| Evaluation | | | | | | | | | |
| Stiffness in torsion (MPa) | 17 | 18 | 18 | 14 | 15 | 15 | 17 | 39 | 28 |
| Mold release properties | ○ | ○ | ○ | X | ○ | ○ | X | ○ | ○ |
| Mold shrinkage factor (%) | 1.3 | 1.3 | 1.3 | 1.1 | 1.3 | 1.3 | 1.1 | 1.3 | 1.4 |
| Heat resistance | ○ | ○ | ○ | ○ | X | X | ○ | ○ | ○ |

From the results of Examples 1 to 3, it can be seen that the resin composition according to the present invention can provide an injection-molded article superior in mold release properties, flexibility and heat resistance.

On the other hand, the following can be seen: in Comparative Example 1 in which component (C) was not used, the mold shrinkage factor was too low, resulting in unsatisfactory mold release properties; in Comparative Example 2 in which component (B) was not used, the resulting injection-molded article had an unsatisfactory heat resistance; in Comparative Example 3 in which the proportion of component (B) was too low, the resulting injection-molded article had an unsatisfactory heat resistance; in Comparative Example 4 in which the proportion of component (C) was too low, the mold shrinkage factor was too low, resulting in unsatisfactory mold release properties; in Comparative Example 5 in which the proportion of component (B) was too high, the resulting injection-molded article had too high a modulus of rigidity and hence it was poor in flexibility; and in Comparative Example 6 in which the proportion of component (C) was too high, the resulting injection-molded article had too high a modulus of rigidity and hence it was poor in flexibility.

What is claimed is:

1. A resin composition comprising:
   (A) an ethylene-α-olefin copolymer meeting the following conditions (A-1), (A-2) and (A-3):
      (A-1) the melt flow rate (MFR) is in the range of from 0.5 to 100 g/10 min,
      (A-2) the density is in the range of from 860 to 920 kg/m$^3$, and
      (A-3) the highest melting peak temperature determined with a differential scanning calorimeter is in the range of from 50° C. to 110° C.;
   (B) an ethylene homopolymer or ethylene-α-olefin copolymer meeting the following conditions (B-1), an (B-2) and (B-3):
      (B-1) the melt flow rate (MFR) is in the range of from 0.5 to 100 g/10 min,
      (B-2) the density is in the range of from 910 to 980 kg/m$^3$, and
      (B-3) the highest melting peak temperature determined with a differential scanning calorimeter is in the range of from 110° C. to 135° C.; and
   (C) a low-density polyethylene as high-pressure radical polymerization product which meets the following conditions (C-1) and (C-2):
      (C-1) the melt flow rate (MFR) is in the range of from 0.5 to 100 g/10 min, and
      (C-2) the swell ratio (SR) is in the range of from 1.3 to 2.0,
         said resin composition comprising 40 to 90% by weight of component (A), 5 to 30% by weight of component (B) and 5 to 30% by weight of component (C) when the total proportion of component (A), component (B) and component (C) is taken as 100% by weight.

2. The resin composition of claim 1, which comprises 55 to 84% by weight of component (A), 8 to 25% by weight of component (B) and 8 to 20% by weight of component (C).

3. The resin composition of claim 1, wherein conditions (A-1), (A-2) and (A-3) are as follows:
   (A-1) the melt flow rate (MFR) is in the range of from 1 to 50 g/10 min,
   (A-2) the density is in the range of from 863 to 910 kg/m$^3$, and
   (A-3) the highest melting peak temperature determined with a differential scanning calorimeter is in the range of from 55° C. to 100° C.

4. The resin composition of claim 1, wherein conditions (B-1), (B-2) and (B-3) are as follows:
   (B-1) the melt flow rate (MFR) is in the range of from 1 to 70 g/10 min,
   (B-2) the density is in the range of from 915 to 965 kg/m$^3$, and
   (B-3) the highest melting peak temperature determined with a differential scanning calorimeter is in the range of from 115° C. to 135° C.

5. The resin composition of claim 1, wherein conditions (C-1) and (C-2) are as follows:
   (C-1) the melt flow rate (MFR) is in the range of from 1 to 50 g/10 min, and
   (C-2) the swell ratio (SR) is in the range of from 1.55 to 1.95.

6. The resin composition of claim 1, wherein component (A) is an ethylene-butene-1 copolymer or an ethylene-hexene-1 copolymer.

7. The resin composition of claim 1, wherein component (B) is an ethylene homopolymer, an ethylene-butene-1 copolymer or an ethylene-hexene-1 copolymer.

8. An injection-molded article comprising the resin composition of claim 1.

9. The injection-molded article of claim 8, which has a mold shrinkage factor of 1.2 to 1.6%.

10. The injection-molded article of claim 8, which comprises 55 to 84% by weight of component (A), 8 to 25% by weight of component (B) and 8 to 20% by weight of component (C).

11. The injection-molded article of claim 8, wherein conditions (A-1), (A-2) and (A-3) are as follows:
    (A-1) the melt flow rate (MFR) is in the range of from 1 to 50 g/10 min,
    (A-2) the density is in the range of from 863 to 910 kg/m$^3$, and
    (A-3) the highest melting peak temperature determined with a differential scanning calorimeter is in the range of from 55° C. to 100° C.

12. The injection-molded article of claim 8, wherein conditions (B-1), (B-2) and (B-3) are as follows:
    (B-1) the melt flow rate (MFR) is in the range of from 1 to 70 g/10 min,
    (B-2) the density is in the range of from 915 to 965 kg/m$^3$, and
    (B-3) the highest melting peak temperature determined with a differential scanning calorimeter is in the range of from 115° C. to 135° C.

13. The injection-molded article of claim 8, wherein conditions (C-1) and (C-2) are as follows:
    (C-1) the melt flow rate (MFR) is in the range of from 1 to 50 g/10 min, and
    (C-2) the swell ratio (SR) is in the range of from 1.55 to 1.95.

14. The injection-molded article of claim 8, wherein component (A) is an ethylene-butene-1 copolymer or an ethylene-hexene-1 copolymer.

15. The injection-molded article of claim 8, wherein component (B) is an ethylene homopolymer, an ethylene-butene-1 copolymer or an ethylene-hexene-1 copolymer.

16. The injection-molded article of claim 8, which is a container, a cap, a packing or a gasket.

* * * * *